UNITED STATES PATENT OFFICE.

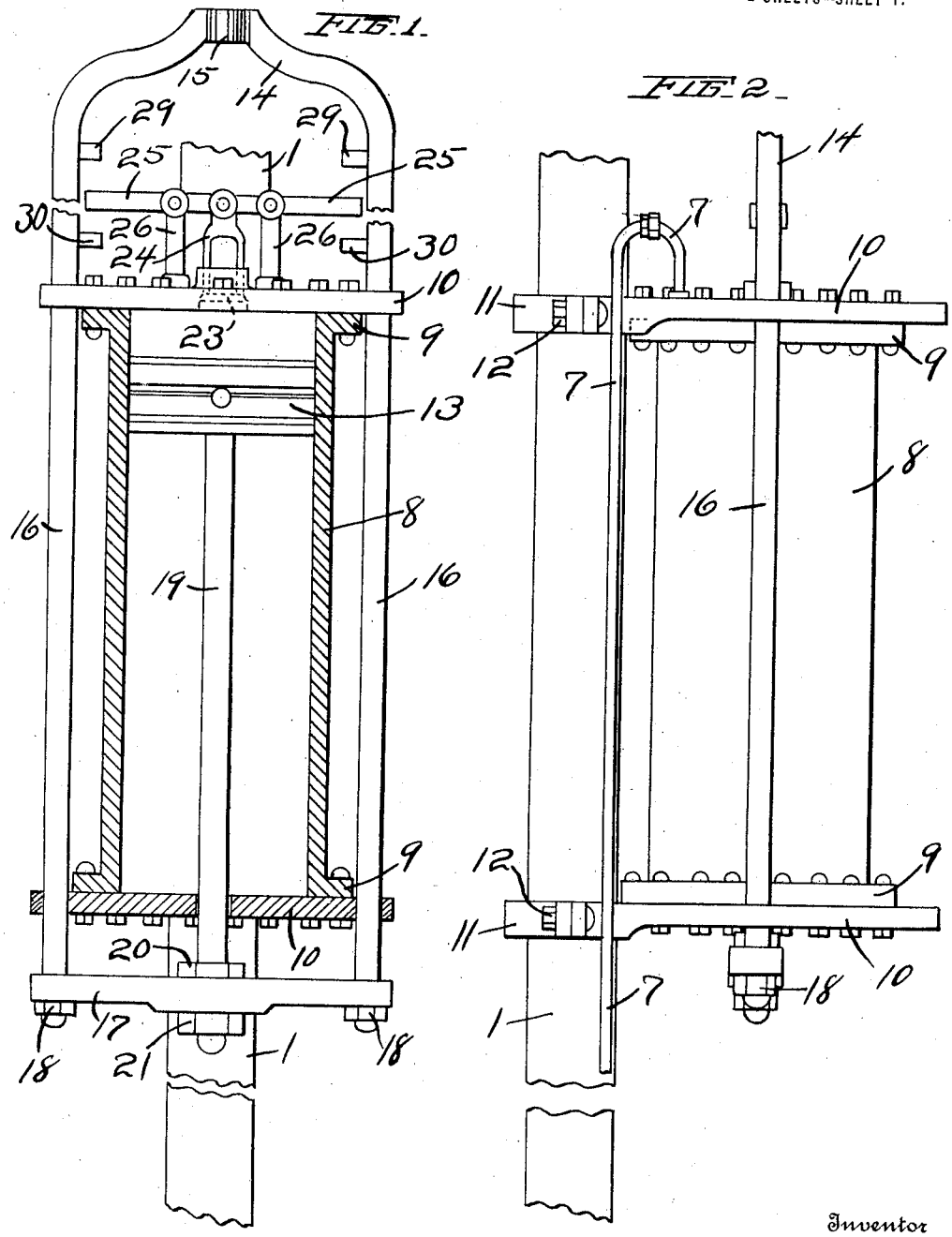

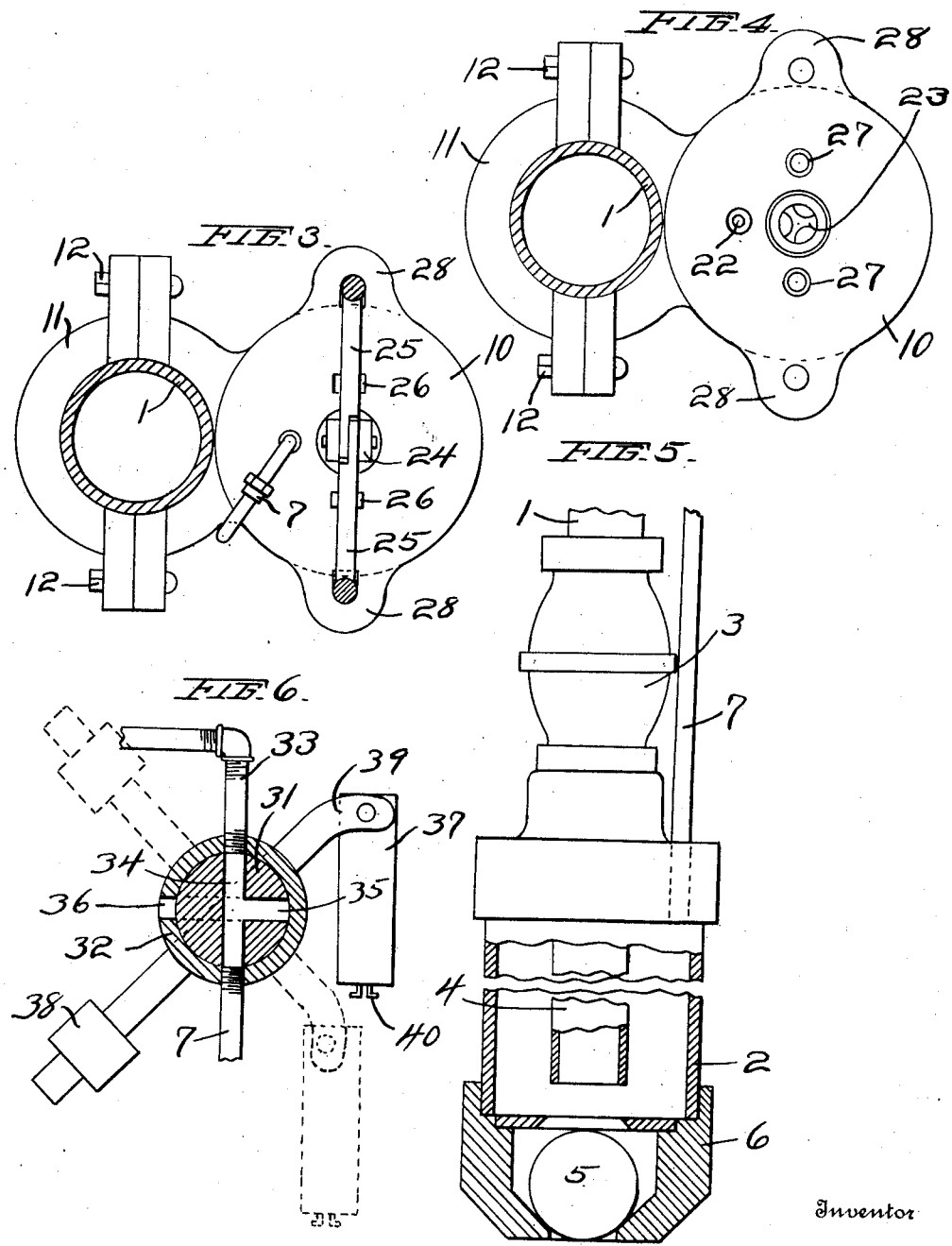

GEORGE W. GOSS, OF LUBBOCK, TEXAS, ASSIGNOR TO PNEUMATIC PUMP COMPANY, OF DALLAS, TEXAS.

PNEUMATIC PUMP.

1,344,883.   Specification of Letters Patent.   Patented June 29, 1920.

Application filed October 22, 1918. Serial No. 259,249.

*To all whom it may concern:*

Be it known that I, GEORGE W. Goss, a citizen of the United States of America, residing at Lubbock, in the county of Lubbock and State of Texas, have invented certain new and useful Improvements in Pneumatic Pumps, of which the following is a specification.

My invention relates to pumps for oil wells and water wells and more particularly to pumps in which the oil or water is raised by means of compressed air; and the object is to provide a pump which can be operated with compressed air or by means of compressed air to force the water or oil out of the wells and to provide a simple means of compressing the air by means of a windmill or by a motor or to provide means of operating the pump by compressed air furnished from a supply source. The advantage of operating with compressed air from a supply source is that a number of wells may be operated at the same time by connecting the pumping apparatus with the supply source of compressed air and this may be done with a common supply pipe for several wells. Other objects and advantages will be fully explained in the following description and the invention will be more particularly pointed out in the claims.

Reference is had to the accompanying drawings which form a part of this application.

Figure 1 is a side elevation of the apparatus at the surface, the air cylinder being shown in section. Fig. 2 is an elevation of the same at right angles to the view shown in Fig. 1. Fig. 3 is a plan view of the apparatus, the operating yoke being shown in horizontal section. Fig. 4 is a plan view with the operating yoke and levers removed. Fig. 5 is a side elevation of the apparatus at the bottom of the well, partly in section. Fig. 6 is a vertical section of a switch valve or three way valve and means for operating the valve, the mechanism or apparatus being a variation from the apparatus previously shown.

Similar characters of reference are used to indicate the same parts throughout the several views.

A pipe 1 of ordinary construction is used. At the lower end of pipe 1 a trap 2 is used. The pipe 1 is provided with a check valve 3 and the part 4 of the pipe projects down into the trap 2. The trap consists of a hollow cylinder and a foot valve 5 for controlling the intake and preventing the water or other liquid from going backwardly or down when a charge of compressed air is applied thereto. The cap 6 is screwed on the bottom of the trap 2. The compressed air is forced down into the trap 2 through an air pipe 7 which is connected to an air compressor cylinder 8. The cylinder 8 is provided with flanges 9 and caps 10 are bolted to the flanges 9. The caps 10 form parts of clamps for attaching the air cylinder 8 to the pipe 1. Coöperating clamping members 11 engage the pipe 1 and clamp the cylinder 8 to the pipe 1. The members 11 are secured to the caps 10 by bolts 12. A piston 13 is used to compress the air in cylinder 8. A yoke 14 has a socket 15 for connection with a windmill operating rod or to some actuating part of a motor and has depending arms 16 for operating the piston 13. A bar 17 is held on the arms 16 by nuts 18 and the bar 17 is attached to the piston rod or plunger rod 19 by nuts 20 and 21. When the windmill or motor is running the piston 13 will be moved vertically or reciprocated vertically and force charges of air out of the cylinder through the air pipe 7 which is tapped into the cylinder through opening 22. The cylinder 8 is provided with an air intake valve 23 which is connected to an operating yoke or cage 24. Levers 25 are pivotally connected to the yoke 24, as shown in Figs. 1 and 3. The levers 25 are provided with fulcrum posts 26 which are rigid in sockets 27 on the cap 10. The arms 16 operate through ears 28 on cap 10 for guides. The arms 16 are provided with lugs 29 and 30 for actuating the levers 25. On the down stroke, the lugs 29 will engage the levers 25 and open the valve 23 to take in a charge of air. On the upstroke, the lugs 30 will engage the levers 25 for closing the valve 23 so that the air will be compressed and forced down the pipe 7 to trap 2. The trap 2 is full of water when the air is forced down pipe 7 and the air pressing on the surface of the water in the trap 2, will force the water up pipe 4 through check valve 3 into pipe 1 to be discharged at the surface or delivered The device shown in Fig. 6 may be substituted for the apparatus above described. The same pipe 1 and the same air pipe 7 are used. A three-way valve 31 is mounted in a stationary casing 32. The pipe 7 is connected to the casing 32 and a supply pipe 33 is connected to casing 32 and to a supply source of compressed air. The valve 31 has a feed opening 34 and a discharge opening 35. When the valve 31 is turned one-quarter turn, the opening 35 will connect with pipe 7 and the lower part of opening 34 will be connected with opening 36 in the casing for discharging or exhausting the compressed air. The valve 31 is actuated by a bucket 37 and a weight 38 which are connected to a lever 39 which is rigid with the valve 31. Means are provided for filling the bucket 37 with water. Such means are not necessary to be described because a part of the water being pumped can be used for this purpose. The bucket 37 is provided with a trip valve 40 and when the bucket becomes full of water, it will pull the lever 39 down to the dotted outline position and the valve 40 will strike a trip and be opened thereby so that the water will run out. The weight 38 will then draw the bucket back to the full line illustration. The apparatus will thus operate automatically and any number of wells may be provided with such apparatus and connected to a supply source of compressed air.

What I claim, is,—

1. A pneumatic pump comprising an intake vessel extending into the water and provided with an intake valve, a water discharge pipe extending into said vessel near the bottom thereof and provided with a check valve above said vessel, an air compressing cylinder attached to said water pipe provided with an intake valve at the upper end, levers operatively connected to said air intake valve, an air feed pipe leading from the upper end of said cylinder to said intake vessel, a piston in said air compressing vessel provided with a plunger rod projecting through the bottom of said vessel, a yoke for vertically reciprocating said piston provided with a cross bar engaging said plunger rod, and means on said yoke for automatically actuating said levers.

2. A pneumatic pump comprising a trap extending into the water, a water discharge pipe operatively connected with said trap, an air compressing cylinder attached to said water pipe and provided with an intake valve and a piston, levers operatively connected with said valve for opening and closing the same, a yoke for connection with an operating power operatively connected with said piston and provided with pairs of lugs for actuating said levers, and an air feed pipe connecting said air compressing cylinder and said trap.

3. A pneumatic pump comprising a trap extending into the liquid to be pumped and provided with an intake valve, a liquid discharge pipe connected with said trap and extending near the bottom thereof and provided with a check valve above said trap, an air feed pipe connected to a supply source of compressed air and to said trap for applying compressed air to the surface of the liquid therein, a valve for alternatingly opening and closing the communication through which air is supplied to said source of compressed air, and means for automatically actuating said valve consisting of levers operatively connected to said valve and a vertically reciprocating yoke provided with means for actuating said levers.

In testimony whereof I set my hand this 18th day of October, 1918.

GEORGE W. GOSS.